Jan. 5, 1954  M. J. O. LOBELLE  2,665,088
SAFETY DEVICE FOR AIRCRAFT SEAT EJECTORS
Filed Feb. 14, 1952  3 Sheets-Sheet 1
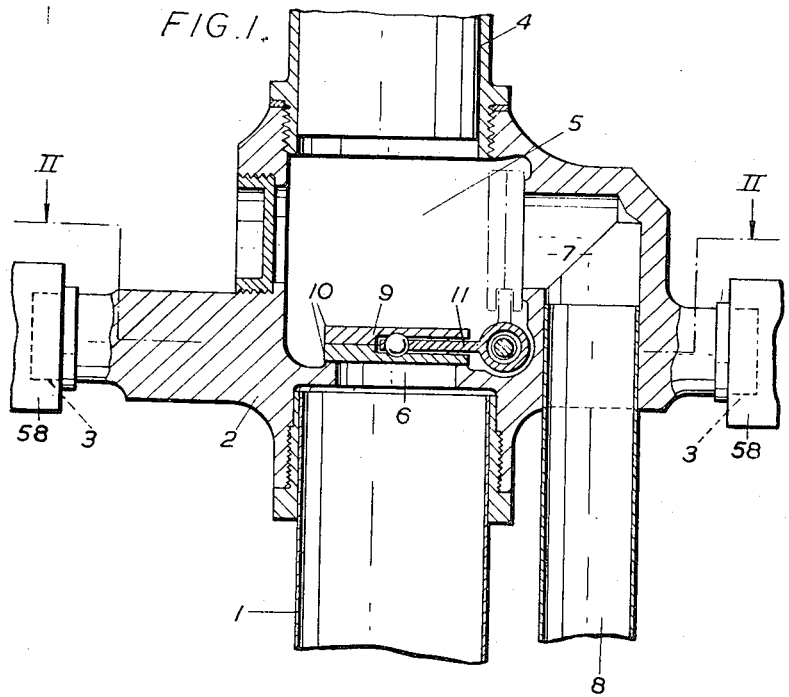
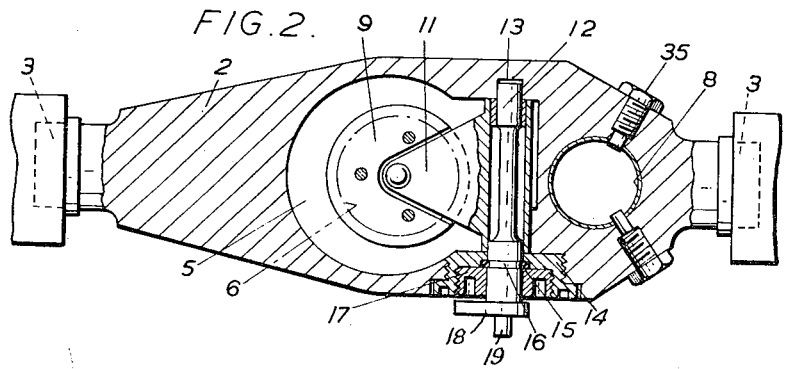
INVENTOR
MARCEL JULES ODILON LOBELLE
BY
Bailey, Stephens & Huettig
ATTORNEYS INVENTOR
MARCEL JULES ODILON LOBELLE
BY
Bailey, Stephens & Huettig
ATTORNEYS

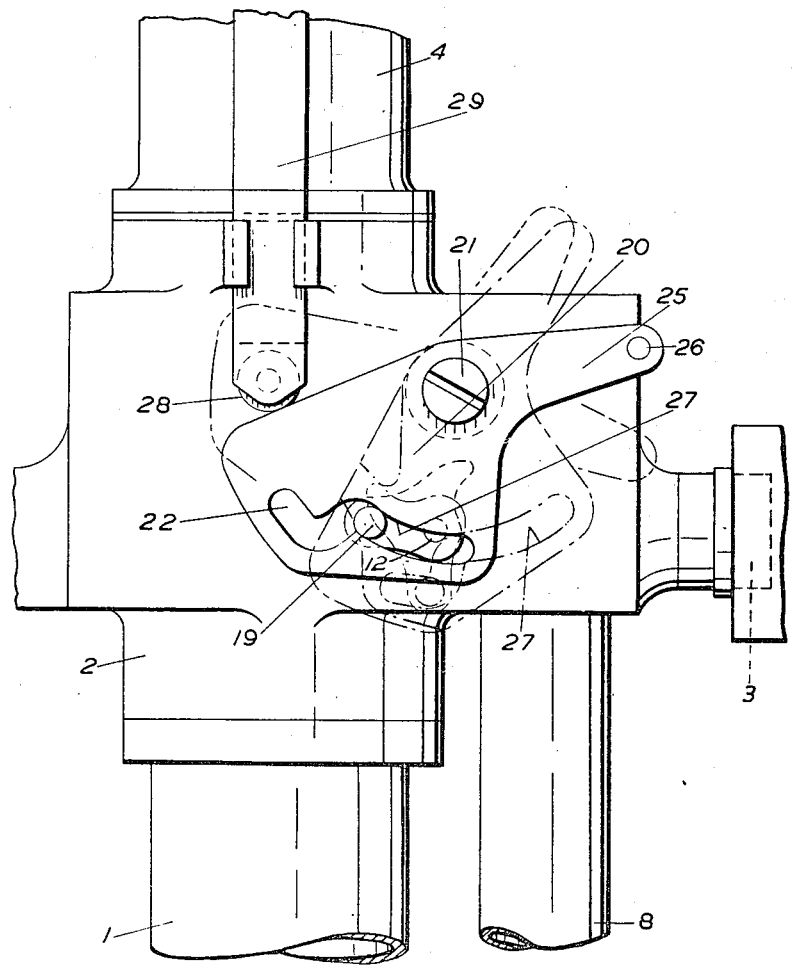

Patented Jan. 5, 1954

2,665,088

UNITED STATES PATENT OFFICE 2,665,088

SAFETY DEVICE FOR AIRCRAFT SEAT EJECTORS

Marcel Jules Odilon Lobelle, Slough, England, assignor to M. L. Aviation Company, Limited, Buckinghamshire, England, a British company Application February 14, 1952, Serial No. 271,516

Claims priority, application Great Britain February 19, 1951

5 Claims. (Cl. 244—122)

The invention relates to seat ejection apparatus for aircraft and comprises a modification of the apparatus described in Patent No. 2,579,683.

According to the Patent No. 2,579,683, seat ejection apparatus for aircraft of the kind wherein the seat is adapted to be ejected through an opening in the aircraft by the pressure of gases generated by an explosive charge, comprises telescopic ejection cylinders operatively interposed between the ejectable seat and the aircraft, an exhaust tube through which the gases generated by the explosive charge can be dissipated in case of inadvertent firing, and a movable breech adapted to hold the explosive charge, the movable breech being normally in communication with the exhaust tube but movable into communication with the ejection cylinders by proper operation of the ejection apparatus.

The object of the present invention is broadly the same in that it is concerned with rendering harmless the consequences of accidental firing, but in particular the object is to provide a safety device for use in conjunction with a fixed breech.

According to the invention, a gun for seat ejection has a breech for holding the explosive charge and which is fixed in relation to at least two telescopically arranged ejection cylinders and to an exhaust tube, through which the gases generated by the explosive charge can be dissipated in case of inadvertent firing, while a movable valve is arranged normally to seal the entry to the ejection cylinders but is movable upon proper operation of the ejection apparatus into a position where it seals the entry to the exhaust tube.

Preferably the valve is a flap valve having a pair of parallel faced discs which are together joined on the ball headed arm attached to a valve spindle, thus giving a small angular movement, so as to ensure accurate seating in both of its alternative positions. The valve is operated by a cam mechanism which prior to actuation, locks the valve in its safe position where it closes the entry to the ejection cylinders. A safety device for an ejection gun according to the invention is illustrated in the accompanying drawings, in which:

Figure 1 is a sectional front view showing a valve chamber;

Figure 2 is a sectional plan view taken on the line II—II of Figure 1;

Figure 4 is a front view showing the operation of the cam.

Figure 3:
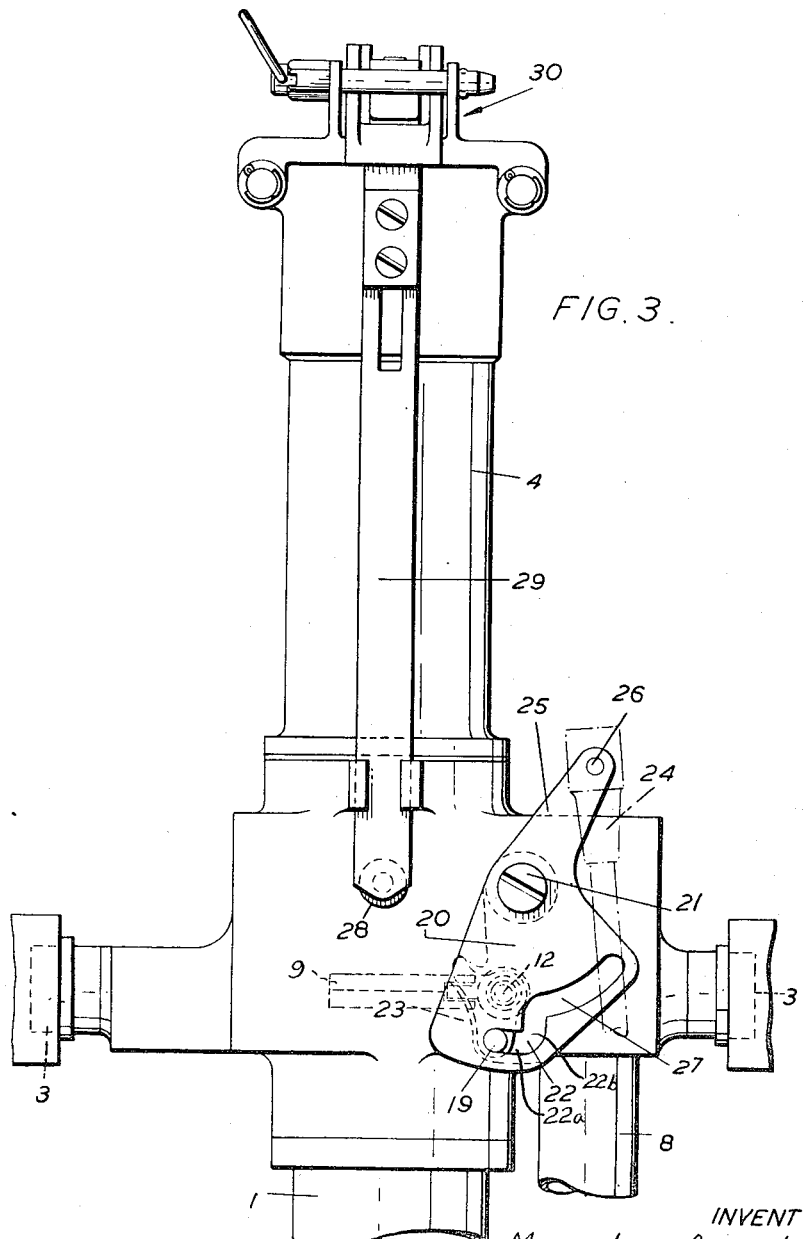
Figure 3 is a front view showing a cam in the safe position.

The cylinders of the gun are arranged so that the outer ejection cylinder 1 has attached at its upper end a trunnion block 2 having lugs 3 that project from each side into bearing blocks 58, thus forming a pivotal connection to the seat back structure as in Patent No. 2,579,683. The cylinder 1 is thus the exact counterpart of the cylinder 42 shown in the drawings of the aforesaid patent.

The central portion of the block 2 lies between the outer ejection cylinder 1, and a breech tube 4 screw-threaded thereto thus leaving a valve chamber 5 within the block 2. The valve chamber 5 has one outlet 6 connected to the ejection cylinder 1 and a further outlet 7 leading to an exhaust tube 8 which is retained on the block 2 by screws 35. The breech tube 4 is mounted with its axis parallel to, but is slightly offset from the axis of the ejection cylinder 1. In the valve chamber 5 is a flap valve 9 composed of two flat parallel faced discs 10 having a space between them to allow a triangular shaped ball headed arm 11 to be held therein, thus allowing for a small angular movement which allows the valve to seat properly over the required aperture in the valve chamber. The ball headed arm 11 is mounted on a spindle 12 which is mounted within the block 2, one end being contained in a recess 13 of the block 2 and the other end in a bearing 14 screw-threaded in the block 2 and retaining the valve spindle 12 therein by a split ring 15 mounted in a groove 16 in the spindle 12. The spindle 12 is made of resilient material to act as a torsion spring when holding the valve in either position. The split ring 15 is held in position by means of a threaded retaining ring 17 screwed into the bearing 14. Attached to the valve spindle 12 is a bell-crank lever 18 having a stud 19 on one of its arms which engages a slot 22 of a cam plate 20 pivoted at 21 on the block 2.

The safe position of the gun (shown in Fig. 3) is when the second arm 31 of the bell-crank lever 18 is held between raised surfaces 23 and 32 on the rear face of the cam plate 20, thus keeping the valve in a position which covers the aperture 6 leading to the ejection cylinders. In operation the cam plate 20 is moved by a rod 24 attached to an extension 25 of the cam plate 20, pivoted at 26. When rod 24 is pulled in a downward direction, it rocks the cam plate 20 in a clockwise direction. The first effect of this movement is that the stud 19 moves along a portion 22a of the slot 22, and since this portion forms an arc of a circle about pivot 21, no appreciable movement is transmitted to the stud 19. Further movement of the plate 20 forces the stud 19 around a right-angled bend 22b so that the stud 19 rides up the shoulder of the bend and thereby rocks the lever 18 into the horizontal position shown in Figure 4. This in turn moves the valve 9 to a position which covers the aperture 7 leading to the exhaust tube 8 (broken line position in Figure 1). Once the stud 19 has passed the bend 22b, it moves into a portion 27 of the slot 22, which is again a portion of a circle described about the pivot 21, which thus imparts no further movement to the stud but locks it in position, thus firmly holding the valve 9 on its seating covering the exhaust tube 8. As shown in Figure 4, the stud has just entered the portion 27 of the slot, the dotted line showing successive positions of the cam plate 20. The provision of the portion 27 of the slot 22 in addition to locking the stud allows the cam plate 20 to turn further until it engages a roller 28 on a push rod 29, which is connected to the firing mechanism of the gun contained in the head of the breech 4 as indicated by arrow 30. When the firing mechanism is released the gas from the explosive charge passes into the ejection cylinder, since the valve 9 is covering the aperture 7 leading to the exhaust tube 8 and not the aperture 6 as when in the safe position. It will be appreciated that any type of valve such as a poppet valve may conveniently be used.

I claim:

1. In an aircraft, in combination with a seat, a gun for seat ejection comprising in combination breech means and firing means for firing an explosive charge enclosed within said breech means, said breech means being connected to said seat, an ejection cylinder, an exhaust tube through which gases can be dissipated in case of inadvertent firing of said explosive charge, said breech means being rigidly connected to and in communication with said ejection cylinder and said exhaust tube, valve means for sealing alternatively said ejection cylinder or said exhaust tube from said breech means, means for moving said valve means from sealing relationship with said ejection cylinder to sealing relationship with said exhaust tube, and means for operating said firing means in timed relation with said valve means.

2. A gun as claimed in claim 1 in which said valve means is a flap valve comprising a valve spindle, a ball headed arm attached to said valve spindle, a pair of parallel faced discs joined together on said ball headed arm, said ball headed arm giving a small angular movement so as to ensure accurate sealing relationship with said valve in both of its alternative positions.

3. A gun as claimed in claim 2 comprising a bell-crank lever attached to said valve spindle, a stud attached to one arm of said bell crank lever, a cam plate with a slot so formed to engage said stud of said bell-crank lever and a pivot supporting said cam plate on said breech means.

4. A gun as claimed in claim 3 in which the contour of said slot of said cam plate comprises two portions, the first for turning said valve from its sealing relationship with said ejection cylinders by means of said stud on said bell-crank lever and the second, on further rotation of said cam plate for holding said stud in a position which locks said valve into sealing relationship with said exhaust tube.

5. In an aircraft, in combination with a seat, a gun for seat ejection comprising in combination, breech means and firing means for firing an explosive charge enclosed within said breech means, a hollow trunnion block connected to said seat, said breech means being connected to said hollow trunnion block, an ejection cylinder, an exhaust tube through which gases can be dissipated in case of inadvertent firing of said explosive charge, said ejection cylinder and said exhaust tube being connected to and in communication with said hollow trunnion block, a flap valve, a ball-headed arm attached to said flap valve, said ball-headed arm giving a small angular movement so as to ensure accurate sealing relationship with said valve in both of its alternative positions, a spindle mounted within said hollow trunnion block and attached to said ball-headed arm of said flap valve, a bell-crank lever having two arms and attached to said spindle, a stud on one of said arms of said bell-crank lever, a cam plate with a slot so formed to engage said stud on said bell-crank lever, the rear of said cam plate being formed with a pair of raised portions, said raised portions cooperating to engage the second arm of said bell-crank lever when said valve is in sealing relationship with said ejection cylinder, a lever attached to said cam plate such that when said lever is pulled said cam plate moves said valve by said stud of said bell-crank lever engaging said slot, the contour of said slot being shaped to turn said valve from sealing relationship with said ejection cylinder and then lock it in sealing relationship with said exhaust tube, and a push rod engageable by said cam plate for releasing said firing means in said breech means.

MARCEL JULES ODILON LOBELLE.

References Cited in the file of this patent

UNITED STATES PATENTS

| Number | Name | Date |
| --- | --- | --- |
| 1,559,183 | Rimailho | Oct. 27, 1925 |
| 2,541,087 | Musser | Feb. 13, 1951 |

FOREIGN PATENTS

| Number | Country | Date |
| --- | --- | --- |
| 747,296 | France | Mar. 28, 1933 |